United States Patent [19]

Dexter et al.

[11] Patent Number: 4,724,248

[45] Date of Patent: Feb. 9, 1988

[54] VOLTAGE STABILIZING ESTERS AND URETHANES

[75] Inventors: Martin Dexter, Briarcliff Manor; David H. Steinberg, New York, both of N.Y.

[73] Assignee: Ciba-Geigy Corporation, Ardsley, N.Y.

[21] Appl. No.: 881,539

[22] Filed: Jul. 2, 1986

[51] Int. Cl.$^4$ .................... C07C 125/04; C07C 59/11
[52] U.S. Cl. .............................. 524/262; 174/110 SR; 174/110 PM; 524/262; 524/265; 524/266; 525/28; 525/29; 528/26; 528/26.5; 528/28; 556/420; 556/437
[58] Field of Search ...................... 524/262, 265, 266; 525/28, 29; 174/110 PM, 110 SR; 528/26, 26.5, 28; 556/420, 437

[56] References Cited

U.S. PATENT DOCUMENTS

| 3,427,271 | 2/1969 | McKellar | 556/420 |
| 3,647,749 | 3/1972 | Zaweski et al. | 524/262 |
| 4,132,702 | 1/1979 | Schmidt et al. | 556/437 |
| 4,283,505 | 8/1981 | Kleeberg et al. | 524/265 |
| 4,543,381 | 9/1985 | Barlow et al. | 524/262 |
| 4,608,306 | 8/1986 | Vincent | 524/265 |

FOREIGN PATENT DOCUMENTS 502913 2/1976 U.S.S.R. .

*Primary Examiner*—Veronica P. Hoke
*Attorney, Agent, or Firm*—Harry Falber

[57] ABSTRACT

Esters and urethanes of certain polydialkylsiloxanepolyoxyalkylene block and graft copolymers which impart high voltage stabilization to dielectric olefin polymers, the stabilized olefin polymer insulating materials resulting therefrom and electric wire or cable insulated therewith.

27 Claims, No Drawings

VOLTAGE STABILIZING ESTERS AND URETHANES

FIELD OF THE INVENTION

This invention relates to novel compounds having the property of imparting high voltage stabilizing qualities to high dielectric polymers. More particularly, it relates to esters and urethanes of certain polydialkylsiloxanepolyoxyalkylene block and graft copolymers which stabilize polyethylene, crosslinked polyethylene and similar polyolefin dielectric materials used as insulators for wire to combat electrical failure at elevated voltages in a wet environment.

Additionally, the invention relates to wire insulating compositions and composite wires including these compounds in the insulation and also to the method of stabilizing wire insulations against dielectric breakdown under voltage stress in wet surroundings utilizing these silane polymers.

BACKGROUND OF THE INVENTION

Polymeric compositions are extensively used as insulation materials for high voltage wire and cable. Olefin homo- and copolymers are the insulation materials of choice for high voltages (5000+ volts) based on desirable electrical and physical properties such as dielectric strength; toughness, such as resistance to cutting and abrasion; ageing characteristics; resilience; and mininal cracking on mechanical stress. Polyethylene, polypropylene and blends thereof polymerized in different densitites as well as copolymers thereof with each other and other comonomers are usually used.

It has been noted that such polyolefin-based materials when used as insulation materials in high voltage distribution wires and cable are prone to deterioration under voltage stress in wet environment resulting in electrical failure. The latter deterioration may result from a degradation phenomenon identified as "water trees". Under high voltage wet-stress, microscopic channels, i.e. dendritic voids, appear in the insulation. These have a tree-like appearance—hence, the name. Such failure is most disadvantageous. This problem is now aggravated in that many high voltage cables are buried for greater reliability (decrease of damage from high winds, ice storms, etc.) and for aesthetic reasons. Over extended periods of time, short circits have occurred in such buried cables resulting in loss of service. These cables have to be removed by excavation and replaced, a time consuming and costly operation.

Many classes of chemical compound additives have been disclosed in the prior art as effective voltage stabilizers, i.e. suppressants for electrical failure, water-treeing and/or electrical-treeing (microscopic dentrites caused by corona arcing). These prior art disclosures include voltage stabilizers based on silicon derivatives, furfuryloxy phosphites and high-molecular weight polyethylene oxide.

In the prior art, Kowasaki, U.S. Pat. No. 4,305,849, teaches the use of polyethylene glycols having molecular weights of from about 1,000 to 20,000 as voltage stabilizers.

Ashcraft et al in U.S. Pat. Nos. 4,144,202 and 4,263,158 teach the use of organosilane compounds containing azomethine groups as voltage stabilizers.

Turbett et al in U.S. Pat. No. 4,376,180 disclose the use of 3-(N-phenylaminopropyl-tridodecyloxysilane) as a voltage stabilizer.

Turbett in U.S. Pat. No. 4,440,671 discloses the use of a blend of hydrocarbon-substituted diphenyl amine and a high molecular weight polyethylene glycol for this purpose.

Braus et al, U.S. Pat. No. 4,514,535 disclose the use of tritetrahydrofurfuryloxy phosphite as a voltage stabilizer.

Beasley et al in U.S. Pat. No. 4,374,224 disclose the use of an organic carboxylic ester having at least one aromatic ring and at least three carboxylic ester groups as a voltage stabilizer.

U.S. Pat. No. 3,553,348 describes the use of filler minerals such as magnesium silicate, pretreated with alkyl and vinyl alkoxysilanes, as voltage stabilizers.

It will be noted from most of these prior art teachings that previous experimenters have relied upon a test based on a microscopic examination of the voltage stressed polymer. The number of "trees" and their length were utilized to judge the resistance deterioration of the insulation. These tests were based on the assumption that "tree" length and the number of trees could be used to approximate the relative useful life of the insulation. These tests, while rapid, are subject to many variables not quite analagous to the actual service conditions.

In contrast, the polymers of this invention and representative compounds of the above mentioned prior art have been tested and compared herein by the use of actual wires coated with the test material compositions. These wires are immersed in a water bath and subjected to high voltage until electrical failure. This test methodology is more closely analagous to the conditions leading to electrical failure of buried distribution cables, and thus provides a meaningful method of illustrating the improved performance characteristics of the instant compounds.

THE INVENTION

This invention is based on the discovery that a group of polydialkylsiloxanepolyoxyalkylene block and graft copolymers, and preferably polydimethylsiloxanepolyoxyethylene block and graft copolymers, have the quality of stabilizing insulated wires against high voltage stresses in an aqueous environment.

The novel voltage stabilizing compounds of this invention are selected from the group consisting of (I) certain esters of silicon-diol BAB-type block copolymers and (II) silicon graft copolymers, wherein said group I block copolymers have the formula:

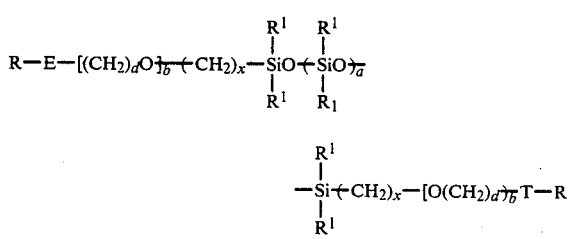

wherein
a is 2–100;
b is 1–100;
x is 2–8;

d is 2-4;
E is

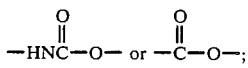

T is

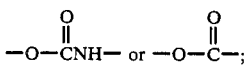

$R^1$ is $C_1$-$C_6$alkyl
R is $C_4$-$C_{30}$alkyl, phenyl,

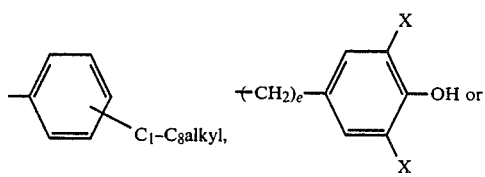

$$-D-NH-\overset{O}{\underset{\|}{C}}-OR'';$$

e is 1-6;
X is independently $C_1$-$C_{18}$alkyl or $C_5$-$C_{12}$cycloalkyl;
D is $C_1$-$C_6$alkylene, phenylene, $C_7$-$C_9$aralkylene or diphenylene-methane; and
R" is $C_4$-$C_{30}$alkyl, phenyl,

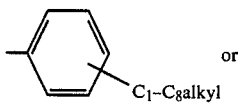 or

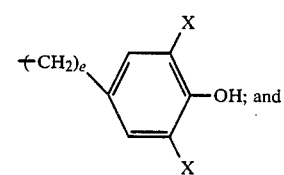 (Ia)

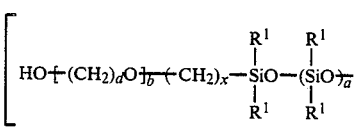

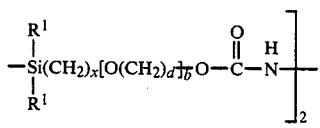

wherein a, b, d, x, $R^1$ and D are defined as above; and wherein the graft silane polymer (II) has the formula:

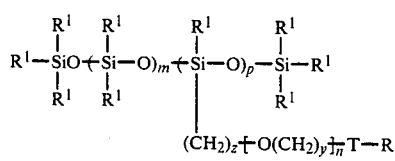

where m is 2-100, n is 1-100, p is 2-4, y is 2-4, z is 2-8 and T, R and $R^1$ are as set forth above.

Preferred and most preferred values and substituents include a=6-24 (13-17), b=8-30 (10-14), x and z=3, d=2, m=3-12 (4-8), n=6-30 (11-15), p=3 and y=2 with the various alkyl groups preferably having a maximum of 18 carbon atoms and including methyl, ethyl, n-butyl, hexyl, 2-ethylhexyl, n-octyl, decyl, dodecyl and octadecyl. X is preferably branched $C_4$-$C_8$alkyl such as tert-butyl, tert-pentyl and tert-octyl, or cyclohexyl. D is preferably $C_1$-$C_6$ alkylene such as methylene, ethylene and hexylene. $R^1$ is preferably methyl.

For purposes of ease of description, the novel polymers of this invention will be referred to as esters whether they are urethanes, the reaction products of the hydroxy-terminated polymers with isocyanates; or true esters.

These novel compounds are prepared by reacting as intermediates, silane polymers compounds including hydroxy terminated LAL-type block copolymers (III) having the structure:

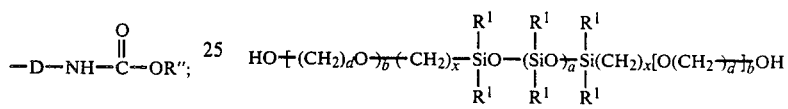

wherein a, b, d, x and $R^1$ are as previously defined, as represented by the copolymer having a= ~15, b= ~12, d=2, x=3 and $R^1$=$CH_3$ marketed as Dow Corning Fluid Q4-3667; or (IV) the graft copolymer having the structure:

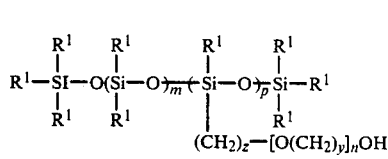

wherein m, n, p, y, z and $R^1$ are as previously defined, as represented by the copolymer having m= ~6, n= ~13, p= ~3, y=2, z=3 and $R^1$=$CH_3$ marketed as Dow Corning Surfactant 193; with an isocyanate or acid having the formulae:

wherein R is as previously defined.

Esters of carboxylic acids may be prepared using reaction conditions well known in the art. Thus, the carboxylic acid and the hydroxy terminated polydialkylsiloxanepolyoxyalkylene block or graft copolymer can be heated in a suitable solvent such as toluene at 110°-150° C. The water produced by esterification is separated during the course of the reaction. An acid catalyst such as toluene sulfonic acid may be used to decrease the reaction time.

Correspondingly, the urethanes may be prepared by reacting a hydroxy terminated polydialkylsiloxanepolyoxyalkylene block or graft copolymer with an appropriate isocyanate. The reactants may be reacted with or without the use of a solvent. The reaction temperature may range from 50°-150° C.

Typical isocyanates include butyl, hexyl, octyl, octadecyl, phenyl, tolyl and naphthyl isocyanates. The resulting urethanes and esters are the compounds of this invention. In addition to the isocyanates and acids mentioned above, diisocyanates and dicarboxylic acids may also be condensed with the silane copolymer reactants to form active voltage stabilizer compounds. Typical diisocyanates include 1,6-diisocyanatohexane, tolylene-2,4-diisocyanate and diphenyl-methane diisocyanate. Typical dicarboxylic acids include oxalic succinic, maleic, adipic, isophthalic and terephthalic acids, and the like. The molar ratio of silicon glycol to diisocyanate or diacid will determine whether the product corresponds to formula I or to formula Ia.

The active compounds prepared as above may be formulated into wire-insulating compositions by incorporating those active compounds into olefin polymers and copolymers normally used for wire insulation. The resulting compositions containing the compounds of this invention are formulated into the dielectric compositions in effective amounts usually in the range of 0.1% to 5%, by weight, and preferably 0.3 to 3.0%.

As previously noted, the insulation materials are olefin polymers. Such olefin polymers include low and high density polyethylene; polypropylene; ethylenepropylene copolymers; polybutene; polyisobutylene; copolymers of ethylene and diene monomers such as butadiene, isoprene and the like; terpolymers of ethylene, propylene and diene monomers; copolymers of ethylene and other α-olefins such as butylene and octylene; copolymers of ethylene and vinyl monomers such as vinyl acetate, ethyl acrylate and methyl methacrylate; and blends of polyethylene with polyvinyl acetate, ethylene-propylene copolymer or polydhyroxyethylacrylate. These olefin polymers can also be crosslinked. Crosslinking agents are well known to those skilled in the art and can include for example, organic peroxides. High and low density polyethylene and crosslinked low density polyethylene are preferred for use in this invention.

The compositions of this invention can contain antioxidants such as sterically hindered phenols, aromatic amines, polymerized 2,2,4-tetramethylhydroquinoline, 4,4'-thio-bis(3-methyl-6-tert-butylphenol), thio-diethylene-bis(3,5-di-tert-butyl-4-hydroxy)hydrocinnamate, distearylthiodipropionate, and the like. In addition, materials commonly added to olefin polymer compositions to be used in electrical applications can also be used herein.

The resulting insulation is applied to conductors to form insulated wires and cables. The resulting wires and cables on testing have excellent resistance to deterioration under high voltage stress conditions. Thus, these materials increase the stability of insulated wires under high voltage and wet environments, thereby decreasing the tendency for insulation to fail under extended use at high voltages.

More specifically, the novel compounds discussed above have voltage stabilizing properties of varying degree. They are, however, sufficiently active to at least double the failure time over controls of crosslinked polyethylene insulation that do not contain voltage stabilizers.

The following examples illustrate the preparation of various compounds within the ambit of the invention. They also include the preparation of insulating compositions with these compounds and the coating of compositions therewith.

EXAMPLE 1

A reaction vessel is charged with 84 g (70 meq) of Dow Corning Fluid Q4-3667, a dihydroxy terminated polydimethylsiloxane polyethyleneoxide copolymer (described in more detail above), 21 g (71.6 meq) of n-octadecyl isocyanate and 105 g of toluene and then heated at 95° C. for 5 hours. An infrared analysis shows that the reaction between the isocyanate and terminal hydroxy groups of the silicon derivative is complete. The solvent is removed by distillation under reduced pressure to yield 102 g of an oily product which solidifies on standing to a waxy solid with the following structure:

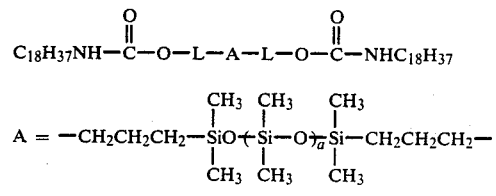

$L = -(CH_2CH_2-O)_b$
$a = \sim 15,$
$b = \sim 12$

EXAMPLES 2 AND 3

These products are prepared using the procedure described in Example 1 except that n-octadecyl isocyanate is replaced with a chemically equivalent amount of hexyl isocyanate in Example 2 and phenyl isocyanate in Example 3.

Examples 2 and 3 are both liquids of the following structures:

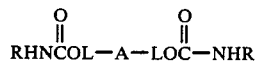

Example 2—R=n—$C_6H_{13}$

Example 3—R=phenyl

A and L as defined in Example 1.

EXAMPLE 4

A solution of 44.32 g (150 meq) of n-octadecyl isocyanate and 150 ml toluene are added to a solution of 120 g (150 meq) of Dow Corning Surfactant 193 (described hereinabove) in 150 ml toluene. The mixture is heated for 12 hours at 94° C. to complete the reaction between the hydroxyl and isocyanate groups. The solvent is removed by distillation under reduced pressure yielding the product, an off-white waxy solid at room temperature.

The structure of the compound is shown below:

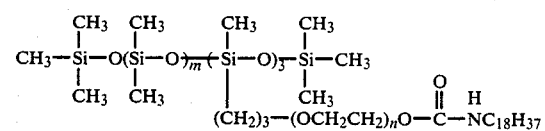

$m = \sim 6$
$n = \sim 13$

EXAMPLE 5

A reaction vessel is charged with 240 g (200 meq) of Dow Corning Fluid Q4-3667 and then, with stirring, 8.21 g (100 meq) of 1,6-diisocyanatohexane. The mixture is heated to 95° C. and maintained at that temperature for 10 hours. At the end of this heating period, the reaction of the isocyanate and hydroxyl groups is complete as evidenced by infrared examination of the reaction mixture. The product is a yellow liquid. The following structure is a representation of the most probable composition:

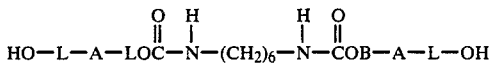

wherein A and L are defined as in Example 1.

EXAMPLE 6

A solution of 240 g (200 meq) of Dow Corning Fluid Q4-3667 and 100 ml toluene is admixed with a solution of 32.44 g (400 meq) of 1,6-diisocyanatohexane and 200 ml toluene. The mixture is heated at 95°-100° C. for 10 hours. The reaction mass becomes rubber-like in consistency. 1000 ml of toluene are added to thin out the mixture so that it becomes stirrable. The diluted mixture is admixed with a solution of 56.8 g (210 meq) of n-octadecanol. The solution is heated for 4 hours at 30°-33° C. After removal of the toluene under reduced pressure, 301 g of a white rubber-like solid are obtained.

Probable structure:

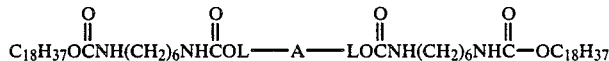

wherein A and L are defined in Example 1.

EXAMPLE 7

A solution of 14.23 g (0.05 mol) stearic acid, 60.0 g Dow Corning Fluid Q4-3667 (0.05 eq), 800 mg p-toluene sulfonic monohydrate acid and 300 ml toluene is heated under nitrogen. After 7 hours, 7 ml water are collected in a Dean-Stark trap. 350 mg of additional p-toluene sulfonic acid monohydrate is added and the mixture heated for 5 hours. An additional 0.1 ml $H_2O$ is collected. The reaction mixture is cooled and extracted with 10% sodium chloride solution to remove p-toluene sulfonic acid. The toluene phase is dried over anhydrous sodium sulfate. After separating the sodium sulfate by filtration, the toluene is distilled under reduced pressure to yield as a residue the stearic acid ester of Q4-3667, a white waxy product. The IR spectrum conforms with the assigned structure.

EXAMPLE 8

This product is prepared by the same general procedure used in Example 7 except that the following reactants are used: Dow Corning Surfactant 193-64 g (0.88 eq) and stearic acid-22.8 g (0.08 eq). 360 ml toluene are used as a reaction solvent and 870mg p-toluene sulfonic acid monohydrate as a catalyst. The stearic acid ester of Dow Corning Surfactant 193 product is a white waxy solid. The infrared spectrum conforms with the desired structure.

EXAMPLE 9

3,5-di-tert-butyl-4-hydroxydihydrocinnamic acid ester of Dow Corning Fluid Q4-3667

6.55 g (0.516 mol) of oxalyl chloride are added over a 15 minute period to a mixture of 13.92 g (0.05 mol) of 4-hydroxy-3,5-di-tert-butyl-dihydrocinnamic acid in 125 ml of methylene chloride. The mixture is stirred and maintained at 0.5° C. A slow stream of nitrogen is passed through the mixture during the addition. After the addition is complete, the mixture is allowed to come to room temperature and stirred overnight (18 hours). A solution of Dow Corning Fluid Q4-3667 60.0 g (0.05 eq) and 3.95 g (0.05 mol) pyridine in 60 ml methylene chloride is added to the solution of 4-hydroxy-3,5-di-tert-butyl-dihydrocinnaminoylchloride over a period of 30 minutes. After the addition, the reaction mixture is allowed to warm to room temperature and stirred for 60 hours. 200 ml of ethyl ether are added to the reaction mixture and the precipitated pyridine hydrochloride is removed by filtration. The filtrate is evaporated under reduced pressure to yield 71.6 g of a viscous liquid residue. NMR analysis conforms with the desired ester product.

EXAMPLE 10

3,5-di-tert-butyl-4-hydroxydihydrocinnamic acid ester of Dow Corning Surfactant 193

The preparation of the 3,5-di-tert-butyl-4-hydroxydihydrocinnamic acid ester of Dow Corning Surfactant 193 is conducted by the procedure of Example 9 except that 40 g (0.05 eq) of Dow Corning Surfactant 193 is substituted for 60.0 g (0.05 eq.) of Dow Corning Fluid Q4-3667. The product of this reaction is a colorless viscous oil (51.9 g). The NMR analysis conforms with the assigned structure.

EXAMPLE 11

Method for Preparing Insulation Compositions

Low density polyethylene (1000 gm) is fluxed in a water-jacketed Banbury mill, the temperature of the polyethylene not being allowed to exceed 105° C. To the fluxed polyethylene is added 2 gm of thiodiethylene bis-(3,5-di-tertiary-butyl-4-hydroxy)hydrocinnamate, 3 gm of dioctadecylthiodipropionate, 20 gm of dicumyl peroxide and 10 gm (1.0% by weight) of the specific voltage stabilizer. After the formulation is thoroughly mixed, it is removed from the Banbury mill and, while still hot and plastic, is rolled into sheets on a two-roll mill. The sheets are cooled and then chopped into granules.

Preparation of Insulated Wire for Testing Insulation Compounds

The granules are extruded over a #14 gauge (64×64 mil) square copper wire using a round die. The outer diameter of the insulation is 124 mil. The polymer is crosslinked by heating in a steam vulcanizing tube at 250 pounds of steam pressure for two minutes. At the end of the two minute heating period, the wire is cooled in water under a pressure of 250 pounds.

Test Procedure

The coated wires to be tested are freed of volatiles such as acetophenone by being baked for 3 weeks at 80° C. For each formulation, ten×30 cm lengths of the insulation coated and baked wire are placed in a 50° C. water bath. A potential difference of 7500 V 60 $H_2$ is applied between the copper conductor and the water bath. At failure, the insulation is perforated permitting water to contact the conductor causing a short circuit. The time required for the failure of the fifth sample is recorded as the failure time for the series of the ten insulated conductors.

TABLE I

| Stabilizer | Test Results Hours to Failure |
|---|---|
| Control (no stabilizer) | 181 |
| A | 466 |
| B | 611 |
| C | 159 |
| Example 1 | 1579 |
| Example 2 | 790 |
| Example 3 | 790 |
| Example 4 | 1170 |
| Example 5 | 733 |
| Example 6 | 539 |
| Example 9* | 593 |
| Example 10* | 959 |

*Separate test series

Compound A (U.S. Pat. No. 4,305,849 to Kowasaki et al) is a polyethylene glycol with an approximate molecular weight of about 15,000. It is a commercial material supplied by Union Carbide Corporation as Polyethylene Glycol 20M. U.S. Pat. No. 4,305,849, claims this material as a voltage stabilizer.

Compound B (U.S. Pat. No. 4,263,158 to Ashcraft et al) is prepared by a procedure described in Example 21 of U.S. Pat. No. 4,263,158. Equimolar quantities of α-aminopropyltrimethoxy silane and benzaldehyde are reacted to yield a condensation product. This product is disclosed as highly effective voltage stabilizer.

Compound C (U.S. Pat. No. 4,376,180 to Turbett et al) is 3-(N-phenylaminopropyl-tridodecyloxysilane) as prepared by the procedure disclosed in U.S. Pat. No. 4,376,180.

From the above, it can be seen that the polymeric compositions of this invention provide excellent protection against electrical failure as compared to the unstabilized controls and the prior art discussed above.

Summarizing, it is seen that this invention provides silicon-containing polymeric compositions for use as effective voltage stabilizers in insulaters for wire and cable. Variations may be made in proportions, procedures and materials without departing from the scope of the invention as defined by the following claims.

What is claimed is:

1. An ester or urethane derivative of a silicone-glycol corresponding to (I) a block copolymer of the formula $$R-E-[(CH_2)_dO]_b-(CH_2)_x-\underset{R^1}{\overset{R^1}{\underset{|}{\overset{|}{Si}}}}O-(\underset{R_1}{\overset{R^1}{\underset{|}{\overset{|}{Si}}}}O)_a$$

$$-\underset{R^1}{\overset{R^1}{\underset{|}{\overset{|}{Si}}}}-(CH_2)_x-[O(CH_2)_d]_b-T-R$$

wherein
a is 2–100;
b is 1–100;
x is 2–8;
d is 2–4;
E is $$-HN\overset{O}{\overset{\|}{C}}-O-\text{ or }-\overset{O}{\overset{\|}{C}}-O-;$$

T is $$-O-\overset{O}{\overset{\|}{C}}NH-\text{ or }-O-\overset{O}{\overset{\|}{C}}-;$$

$R^1$ is $C_1$–$C_6$alkyl

R is $C_4$–$C_{30}$alkyl, phenyl,

[phenyl-$C_1$-$C_8$alkyl], [$-(CH_2)_e$-(2,6-X substituted phenyl)-OH], or $$-D-NH-\overset{O}{\overset{\|}{C}}-OR'';$$

e is 1–6;

X is independently $C_1$–$C_{18}$alkyl or $C_5$–$C_{12}$cycloalkyl;

D is $C_1$–$C_6$alkylene, phenylene, $C_7$–$C_9$aralkylene or diphenylene-methane; and R'' is $C_4$–$C_{30}$alkyl, phenyl,

[phenyl-$C_1$-$C_8$alkyl] or

[$-(CH_2)_e$-(2,6-X substituted phenyl)-OH];

(Ia) a block copolymer of the formula $$\left[HO-((CH_2)_dO)_b-(CH_2)_x-\underset{R^1}{\overset{R^1}{\underset{|}{\overset{|}{Si}}}}O-(\underset{R^1}{\overset{R^1}{\underset{|}{\overset{|}{Si}}}}O)_a\right.$$

$$\left.-\underset{R^1}{\overset{R^1}{\underset{|}{\overset{|}{Si}}}}(CH_2)_x[O(CH_2)_d]_bO-\overset{O}{\overset{\|}{C}}-\overset{H}{\underset{|}{N}}\right]_2-D$$

wherein a, b, d, x, $R^1$ and D are defined as above;

(II) a silicon graft polymer of the formula

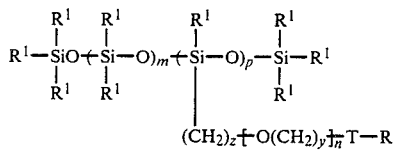

where m is 2-100, n is 1-100, p is 2-4, y is 2-4, z is 2-8 and T, R and $R^1$ are as set forth above.

2. The block copolymer of formula I according to claim 1.

3. The copolymer of claim 2, wherein a is 6-24 and b is 8-30.

4. The copolymer of claim 3, wherein a is 13-17, b is 10-14, x is 3, d is 2, R' is $CH_3$ and X is branched $C_4$-$C_8$alkyl.

5. The block copolymer of formula Ia according to claim 1.

6. The copolymer of claim 5, wherein a is 6-24 and b is 8-30.

7. The copolymer of claim 6, wherein a is 13-17, b is 10-14, x is 3, d is 2 and R' is $CH_3$.

8. The silicon graft copolymer of formula II according to claim 1.

9. The graft polymer of claim 8, wherein m is 3-12 and n is 6-30.

10. The graft polymer of claim 9, wherein m is 4-8, n is 11-15, p is 3, z is 3, y is 2, $R^1$ is $CH_3$, and X is branched $C_4$-$C_8$alkyl.

11. The copolymer of claim 2 corresponding to the formula

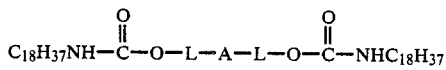

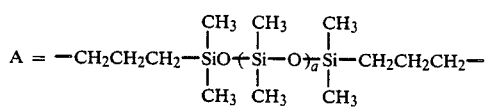

$L = -(CH_2CH_2-O)_b$
$a = \sim 15$,
$b = \sim 12$

12. A block copolymer corresponding to the formula

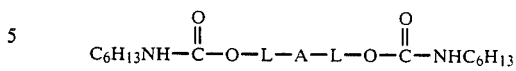

wherein A, B, a and b are as defined in claim 11.

13. A block copolymer corresponding to the formula

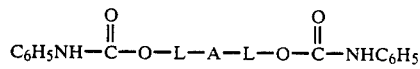

wherein A, B, a and b are as defined in claim 11.

14. The graft polymer of claim 9 corresponding to the formula

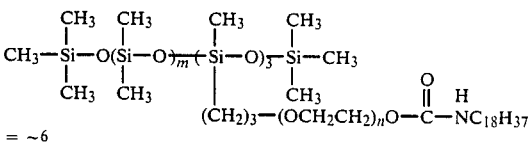

$m = \sim 6$
$n = \sim 13$.

15. The graft polymer of claim 8 corresponding to the formula

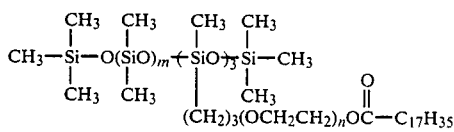

wherein m is $\sim 6$ and n is $\sim 13$.

16. The graft copolymer of claim 10 corresponding to the formula

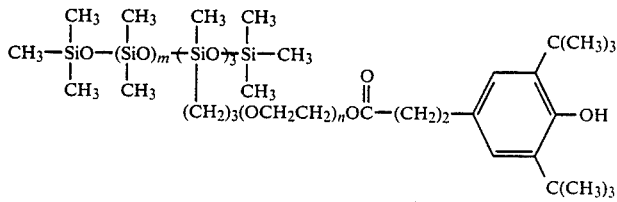

wherein m is $\sim 6$ and n is $\sim 13$.

17. The block copolymer of claim 5 corresponding to the formula

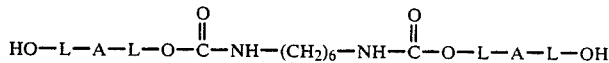

wherein

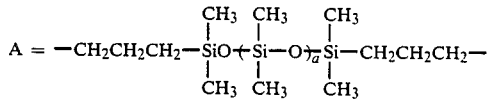

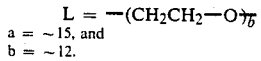
$a = \sim 15$, and
$b = \sim 12$.

18. The block copolymer of claim 2 corresponding to the formula

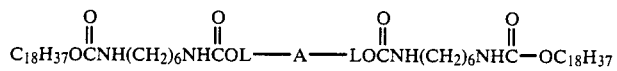

wherein

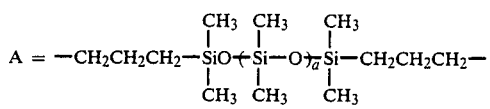

L = —(CH$_2$CH$_2$—O$)_b$
a = ~15, and
b = ~12.

19. The block copolymer of claim 2 corresponding to the formula

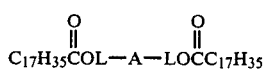

wherein

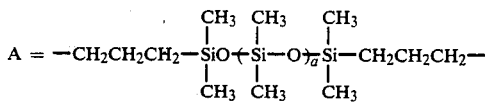

L = —(CH$_2$CH$_2$—O$)_b$
a = ~15, and
b = ~12.

20. The block copolymer of claim 2 corresponding to the formula

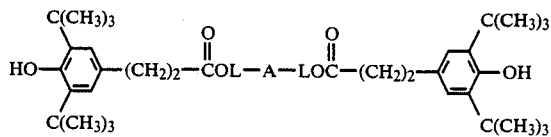

wherein

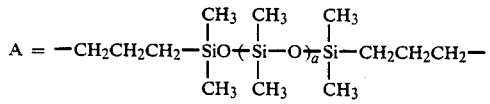

-continued

L = —(CH$_2$CH$_2$—O$)_b$
a = ~15, and
b = ~12.

21. An electrical insulation composition comprising an olefin polymer and an effective voltage stabilizing amount of a silicone-glycol derivative according to claim 1.

22. The composition of claim 21, wherein said silicone-glycol derivative is present in a concentration ranging from about 0.1%–5%, by weight.

23. The composition of claim 21, wherein said olefin polymer is selected from the group consisting of low and high density polyethylene, polypropylene, polybutene, polyisobutylene, copolymers of ethylene and α-olefins, copolymers of ethylene and diene monomers, copolymers of ethylene and vinyl monomers, polyethylene/polyvinyl acetate blend, polyethylene/ethylene-propylene copolymer blend, polyethylene/polyhydroxyethyl acrylate blend and the crosslinked olefin variations thereof.

24. The composition of claim 23, wherein said olefin polymer is high density polyethylene, low density polyethylene or crosslinked low density polyethylene.

25. The composition of claim 23 which also contains a sterically hindered phenol or amine antioxidant.

26. Electric wire or cable insulated with the electrical insulation composition of claim 21.

27. A method of stabilizing an insulating olefin polymer against electrical failure which comprises incorporating therein an effective stabilizing amount of the silicone-glycol derivative according to claim 1.

* * * * *

UNITED STATES PATENT AND TRADEMARK OFFICE
CERTIFICATE OF CORRECTION

PATENT NO. : 4,724,248

DATED : Feb. 9, 1988

INVENTOR(S) : Martin Dexter; David H. Steinberg

It is certified that error appears in the above—identified patent and that said Letters Patent is hereby corrected as shown below:

Column 11, line 10 change "." to --;-- and insert --with the proviso that R cannot be $C_4$-$C_{10}$alkyl or phenyl when E is $-\overset{\overset{O}{\|}}{C}-O-$ and T is $-O-\overset{\overset{O}{\|}}{C}-$ in formula (I) and when T is $-O-\overset{\overset{O}{\|}}{C}-$ in formula (II). --.

Column 12, line 8 change "B" to --L--.
Column 12, line 16 change "B" to --L--.

Column 14, lines 19-22, cancel claim 21 and in lieu thereof insert--

UNITED STATES PATENT AND TRADEMARK OFFICE
CERTIFICATE OF CORRECTION

PATENT NO. : 4,724,248
DATED : Feb. 9. 1988
INVENTOR(S) : Martin Dexter; David H. Steinberg It is certified that error appears in the above—identified patent and that said Letters Patent is hereby corrected as shown below:

21. (Added) An electrical insulation composition comprising an olefin polymer and an effective voltage stabilizing amount of a silicone-glycol derivative corresponding to (I) a block copolymer of the formula

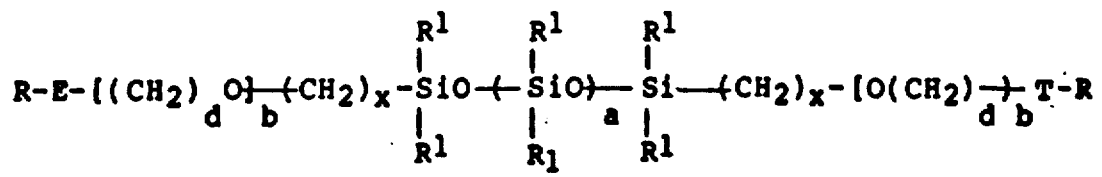

UNITED STATES PATENT AND TRADEMARK OFFICE
CERTIFICATE OF CORRECTION

PATENT NO. : 4,724,248

DATED : Feb. 9. 1988

INVENTOR(S) : Martin Dexter; David H. Steinberg

It is certified that error appears in the above—identified patent and that said Letters Patent is hereby corrected as shown below:

wherein a is 2-100;

b is 1-100;

x is 2-8;

d is 2-4;

E is $-\text{HN}\overset{\overset{\displaystyle O}{\|}}{\text{C}}-\text{O}-$ or $-\overset{\overset{\displaystyle O}{\|}}{\text{C}}-\text{O}-$ ;

T is $-\text{O}-\overset{\overset{\displaystyle O}{\|}}{\text{C}}\text{NH}-$ or $-\text{O}-\overset{\overset{\displaystyle O}{\|}}{\text{C}}-$ ;

UNITED STATES PATENT AND TRADEMARK OFFICE
CERTIFICATE OF CORRECTION

PATENT NO. : 4,724,248

DATED : Feb. 9, 1988

INVENTOR(S) : Martin Dexter; David H. Steinberg

It is certified that error appears in the above—identified patent and that said Letters Patent is hereby corrected as shown below:

$R^1$ is $C_1$-$C_6$alkyl;

R is $C_4$-$C_{30}$alkyl, phenyl

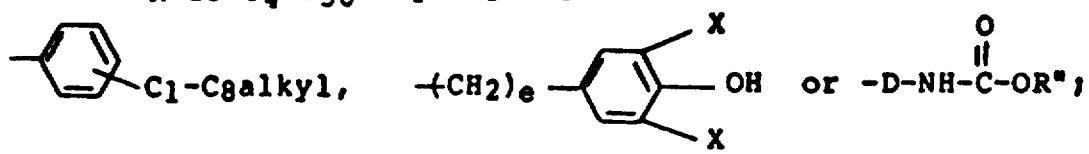

e is 1-6;

X is independently $C_1$-$C_{18}$alkyl or $C_5$-$C_{12}$cycloalkyl;

D is $C_1$-$C_6$alkylene, phenylene, $C_7$-$C_9$aralkylene or diphenylene-methane; and $R''$ is $C_4$-$C_{30}$alkyl, phenyl,

UNITED STATES PATENT AND TRADEMARK OFFICE
CERTIFICATE OF CORRECTION

PATENT NO. : 4,724,248
DATED : Feb. 9, 1988
INVENTOR(S) : Martin Dexter; David H. Steinberg It is certified that error appears in the above—identified patent and that said Letters Patent is hereby corrected as shown below:

(Ia) a block copolymer of the formula

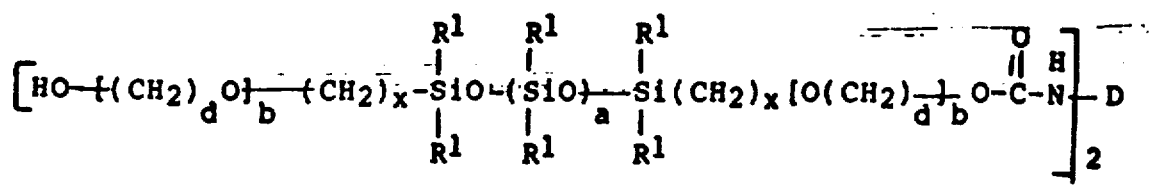

wherein a, b, d, x, $R^1$ and D are defined as above;

(II) a silicon graft polymer of the formula

UNITED STATES PATENT AND TRADEMARK OFFICE
CERTIFICATE OF CORRECTION

PATENT NO. : 4,724,248
DATED : Feb. 9, 1988
INVENTOR(S) : Martin Dexter; David H. Steinberg It is certified that error appears in the above—identified patent and that said Letters Patent is hereby corrected as shown below:

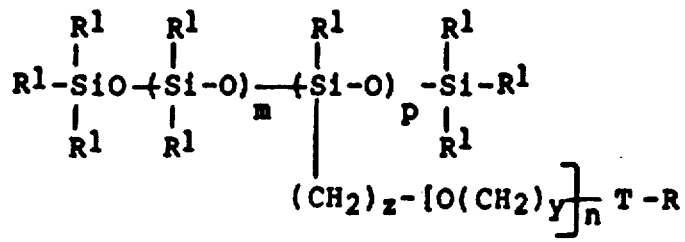

where m is 2-100, n is 1-100, p is 2-4, y is 2-4, z is 2-8 and T, R and $R^1$ are as set forth above.

Signed and Sealed this

Second Day of August, 1988

Attest:

DONALD J. QUIGG

Attesting Officer

Commissioner of Patents and Trademarks